United States Patent
Burg

(10) Patent No.: US 6,741,689 B2
(45) Date of Patent: *May 25, 2004

(54) SYSTEM AND METHOD FOR PROVIDING CALL SUBJECT INFORMATION TO A CALLED PARTY

(75) Inventor: Frederick Murray Burg, West Long Branch, NJ (US)

(73) Assignee: AT&T Corp., New York, NY (US)

(*) Notice: Subject to any disclaimer, the term of this patent is extended or adjusted under 35 U.S.C. 154(b) by 91 days.

This patent is subject to a terminal disclaimer.

(21) Appl. No.: 10/097,305

(22) Filed: Mar. 15, 2002

(65) Prior Publication Data

US 2002/0090064 A1 Jul. 11, 2002

Related U.S. Application Data

(63) Continuation of application No. 08/979,867, filed on Nov. 26, 1997.

(51) Int. Cl.[7] .................. H04M 1/64; H04M 11/00; H04M 3/42
(52) U.S. Cl. .................. 379/201.01; 379/67.1; 379/88.12; 379/88.2; 379/93.35; 379/201.04; 379/215.01; 379/201.07
(58) Field of Search .................. 379/67.1, 69, 76, 379/88.01, 88.12, 88.17, 88.2, 88.22, 142.07, 142.08, 208.01, 209.01, 201.01, 88.79, 201.04, 201.07, 201.08, 93.35, 215.01; 704/240, 260

(56) References Cited

U.S. PATENT DOCUMENTS

| | | | |
|---|---|---|---|
| 5,327,486 A | | 7/1994 | Wolff et al. |
| 5,329,578 A | | 7/1994 | Brennan et al. |
| 5,555,299 A | * | 9/1996 | Maloney et al. ............ 379/212 |
| 5,568,540 A | | 10/1996 | Greco et al. |
| 5,608,786 A | | 3/1997 | Gordon |
| 5,652,789 A | * | 7/1997 | Miner et al. ................ 379/201 |
| 5,740,231 A | | 4/1998 | Cohn et al. |
| 5,742,905 A | | 4/1998 | Pepe et al. |
| 5,752,191 A | | 5/1998 | Fuller et al. |
| 5,835,087 A | | 11/1998 | Herz et al. |
| 5,894,504 A | | 4/1999 | Alfred et al. |
| 5,930,700 A | | 7/1999 | Pepper et al. |
| 5,953,393 A | | 9/1999 | Culbreth et al. |
| 5,991,387 A | | 11/1999 | Shaffer et al. |
| 5,999,965 A | * | 12/1999 | Kelly ......................... 709/202 |
| 6,041,103 A | | 3/2000 | La Porta et al. |
| 6,052,442 A | | 4/2000 | Cooper et al. |
| 6,160,877 A | | 12/2000 | Tatchell et al. |
| 6,400,808 B1 | * | 6/2002 | Burg ....................... 379/88.21 |

* cited by examiner

Primary Examiner—Allan Hoosain

(57) ABSTRACT

A system and method is provided for providing call subject information to a destination device. A call subject platform provides a selection menu to an originating device to receive call subject information. If call subject information is received at the call subject platform from the originating device, then the call subject platform sends a summary of the call subject information to the destination device.

5 Claims, 3 Drawing Sheets

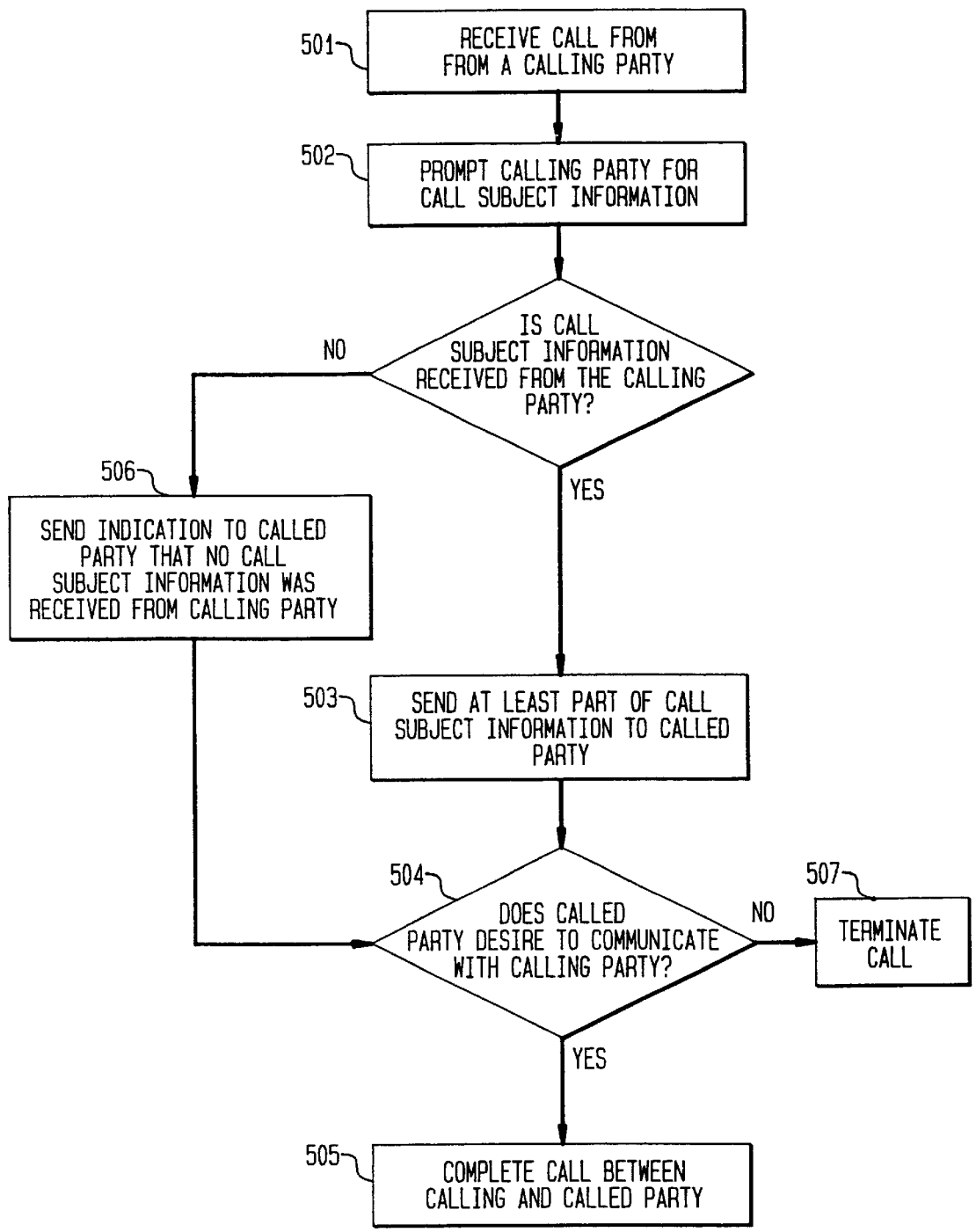

SYSTEM AND METHOD FOR PROVIDING CALL SUBJECT INFORMATION TO A CALLED PARTY

This is a continuation of U.S. application Ser. No. 08/979,867, filed Nov. 26, 1997, entitled SYSTEM AND METHOD FOR PROVIDING CALL SUBJECT INFORMATION TO A CALLED PARTY.

BACKGROUND OF THE INVENTION

The field of the invention is providing information received from a calling party to a called party, and in particular providing call subject information received from a calling party to a called party.

When a calling party desires to communicate with a called party, the called party must often decide whether to communicate with the calling party based upon insufficient information. For example, one known system only provides the called party with a ring when the calling party desires to communicate with the called party. The ring reveals nothing about the identity of the calling party; nothing about the purpose of the communication desired by the calling party; and nothing about the urgency of the communication.

Another known system provides some additional information about a calling party by identifying the name and/or telephone number of the calling party on a display visible to the called party (e.g., "caller ID"). Although this provides more information than only a ring, it still fails to inform the called party as to the purpose of the calling party's intended communication or its urgency. Further, the added information provided by caller ID is worthless in practice when the called party is unfamiliar with the calling party's telephone number and/or name.

With such limited information about the calling party and virtually no information about the topic, contents or urgency of the calling party's communication, a called party may have to communicate with a calling party with which it would rather not. For example, when the calling party is a telemarketer desiring to communicate the advantages of a product it wishes to sell to a called party at the called party's dinner time, the called party may prefer not to communicate with the telemarketer. On the other hand, if the calling party is a hospital official desiring to communicate information pertaining to the medical condition of a member of the called party's family, then the called party may desire to communicate with the official, even at a time that would otherwise be considered inconvenient.

If the called party is only provided with a simple ring as in one known system, the called party does not know whether the calling party is a telemarketer or a hospital official. Thus, the called party feels compelled to communicate with the calling party at least until the calling party can be identified and/or the subject of the call can be ascertained by the called party. If the called party is apprised of the calling party's telephone number and/or name as in another known system, the called party may not be able to distinguish the number or name of the telemarketer from that of the hospital official, and thus may still feel compelled to communicate with the calling party.

A called party needs more information than that provided by known systems to make an informed decision as to whether to communicate with the calling party.

SUMMARY OF THE INVENTION

In one embodiment of the present invention, a system and method provide call subject information from a calling party to a called party. A call subject platform receives a call from a calling party. The call subject platform prompts the calling party to provide call subject information. If call subject information is received at the call subject platform from the calling party, then the call subject platform sends at least part of the call subject information to the called party. The call subject platform then determines if the called party desires to communicate with the calling party.

The present invention advantageously provides more information to a called party about a prospective communication than do known systems. This advantageously provides a more substantial basis upon which the called party can make an informed decision as to whether to communicate with the calling party. In accordance with the present invention, the called party advantageously need not communicate with a calling party to determine if communication with the calling party is desirable. The present invention thus allows the called party to advantageously avoid an unwanted communication with a calling party.

BRIEF DESCRIPTION OF THE DRAWINGS

FIG. 4 is a flow chart showing an embodiment of the method of the present invention.

DETAILED DESCRIPTION

Figure 1:
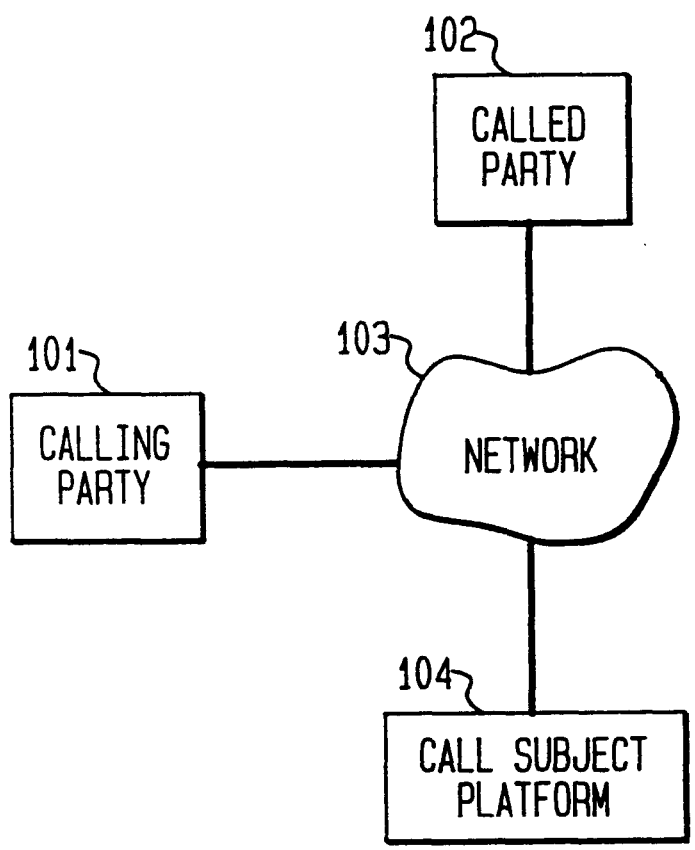
FIG. 1 shows a system-level embodiment of the present invention.

FIG. 1 shows a system-level embodiment of the present invention. Calling party 101, called party 102, and call subject platform 104 are connected to a network 103. In one embodiment, of the present invention, network 103 is the public switched telephone network (PSTN). In another embodiment, network 103 is the Internet. In other embodiments of the present invention, network 103 includes a packet-switched, circuit switched, connectionless, or connection oriented network or interconnected networks, or any combination thereof.

As used herein, the term "computer" is an apparatus that comprises a processor, a memory that stores instructions adapted to be executed by the processor, and a port adapted to be connected to a network. The memory and port are coupled to the processor. Embodiments of memory include a hard disk drive, random access memory (RAM), read only memory (ROM), flash memory, or any combination thereof.

In one embodiment of the present invention, calling party 101 is a telephone. In another embodiment, a calling party 101 is a calling party computer whose memory stores instructions adapted to be executed by the processor to communicate through a network, and to provide call subject information. As used herein, "call subject information" includes any information from the calling party 101 beyond the calling party's 101 identity or telephone number. Examples of call subject information include: information pertaining to the purpose of the telephone call from the calling party 101; information pertaining to the urgency of the telephone call; etc. For example, call subject information can include a reference to a previous call from the called party 102 to the calling party 101: "I'm returning your telephone call of earlier today" from the calling party 101 is an example of call subject information. Call subject information can be advantageously combined with other information (e.g., caller identification information) to contribute to the process of determining how the called party 102 desires to handle the telephone call (e.g., communicate with the calling party 101, forward the call, send the call to a Messaging service, not accept the call, etc.)

In one embodiment, called party 102 is a telephone. In another embodiment, called party 102 is a called party computer. In one embodiment, a called party computer is a computer whose memory stores instructions adapted to be executed by the processor to communicate through a network; to receive call subject information; and to provide an indication as to whether communications are desired with a calling party.

Figure 2:
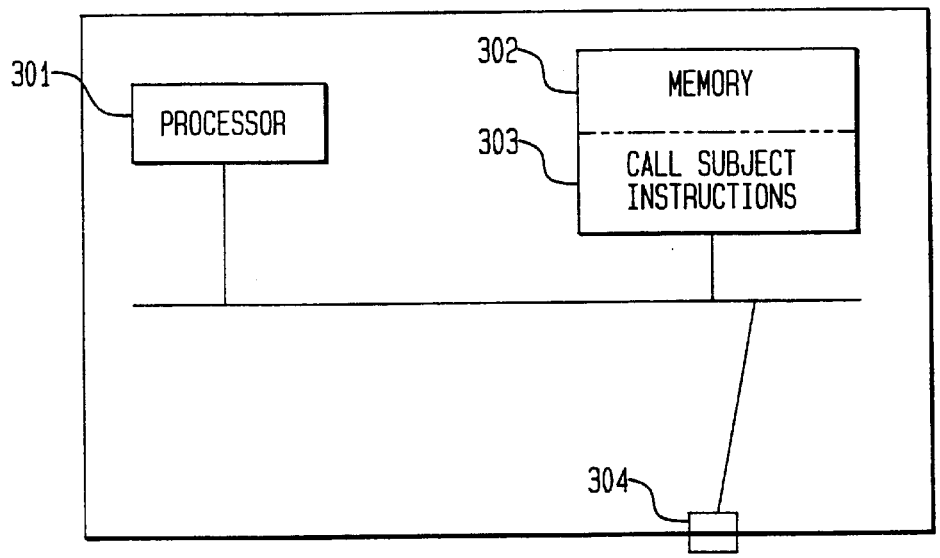
FIG. 2 shows an embodiment of an apparatus in accordance with the present invention.

An embodiment of call subject platform 104 is shown in FIG. 2. Call subject platform 104 comprises a processor 301, a memory 302 that stores call subject instructions 303 adapted to be executed by processor 301 to receive call subject information from calling party 101 and send at least a part of the call subject information to called party 102. Instructions 303 are further adapted to be executed by the processor 301 to determine if called party 102 desires to communicate with calling party 101. In another embodiment, instructions 303 are further adapted to be executed by the processor 301 to establish communications between the calling party 101 and the called party 102 if it is determined that the called party 102 desires to communicate with the calling party 101.

Embodiments of memory 302 include a hard disk drive, random access memory (RAM), read only memory (ROM), flash memory, or any combination thereof. Call subject platform 104 further comprises a port 304 adapted to be connected to a network 103. Port 304 and memory 302 are coupled to processor 301.

Figure 3:
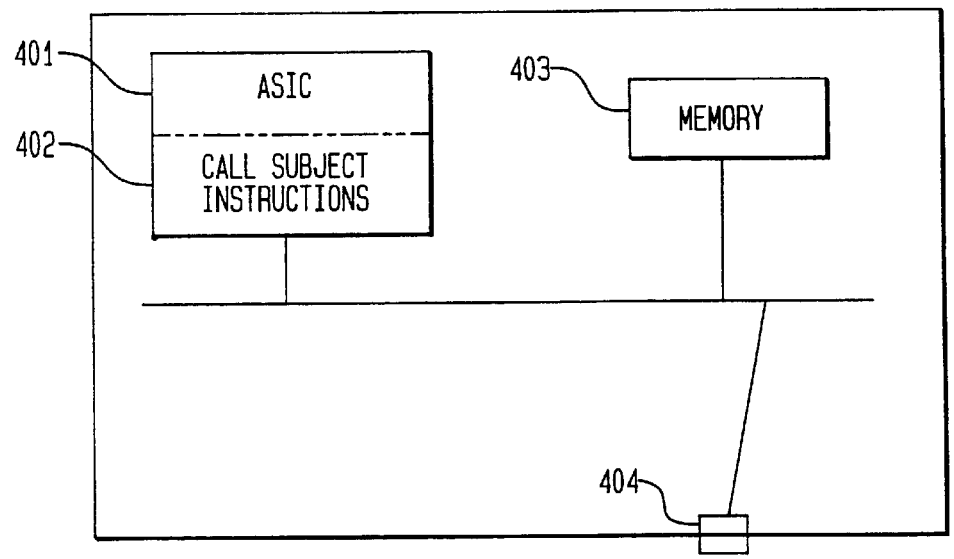
FIG. 3 shows another embodiment of an apparatus in accordance with the present invention.

Another embodiment of the call subject platform 104 is shown in FIG. 3. Call subject platform 104 comprises an application specific integrated circuit (ASIC) 401 that embodies call subject instructions 402 that ASIC 401 executes to receive a call from a calling party, prompt the calling party for call subject information, receive call subject information from the calling party, and determine if the called party desires to communicate with the calling party. In yet another embodiment, instructions 402 are further adapted to be executed by ASIC 401 to establish communications between the calling party 101 and the called party 102.

ASIC 401 further comprises memory 403 and a port 404. Embodiments of memory 403 include a hard disk drive, random access memory (RAM), read only memory (ROM), flash memory, or any combination thereof. Memory 403 and port 404 are coupled to ASIC 401. In one embodiment, memory 403 stores call subject information.

FIG. 4 is a flow chart showing an embodiment of the present invention. The call subject platform receives a call from a calling party, step 501. The call subject platform prompts the calling party for call subject information, step 502. If the call subject platform received call subject information from the calling party, the call subject platform sends at least a part of the call subject information to the called party, step 503. In one embodiment of the present invention, at least part of the call subject information is received from the calling party in a first format (e.g., text) and at least part of the call subject information received in that first format is translated by the call subject platform into a second format (e.g., audio) adapted to be played or displayed to the called party. Techniques known in the art can be used to perform such a translation. Examples of such known techniques include voice recognition, voice-to-text translation, text-to-audio translation, dual tone modulated frequency signal to audio message translation, and so on.

The call subject platform then determines if the called party desires to communicate with the calling party, step 504. In one embodiment, if it is determined that the called party desires to communicate with the calling party, then the call subject platform establishes communications between the calling party and the called party, step 505. In another embodiment, if it is determined that the called party desires to communicate with the calling party, but that the called party is presently unavailable, then the call from the calling party is forwarded to a Messaging Service. In yet another embodiment, if it is determined that the called party desires to communicate with a calling party, then the call is forwarded to another telephone number.

In one embodiment, if the call subject platform does not receive call subject information from the calling party, the call subject platform provides an indication to the called party that no call subject information was received from the calling party, step 506. The call subject platform then determines if the called party desires to communicate with the called party, step 504.

In another embodiment of the present invention, if no call subject information is received from the calling party, then this lack of information automatically results in the determination that the called party does not desire to communicate with the calling party and the call is terminated or forwarded to another telephone number or forwarded to a Messaging Service, etc.

In one embodiment of the present invention, if it is determined that the called party desires to communicate with the calling party, the call subject platform sends a message to a switch. In response, the switch establishes communications between the calling party and the called party.

In one embodiment of the present invention, call subject information is obtained by the call subject platform from the calling party by requesting the calling party to select an item of call subject information from a plurality of items of call subject information. This can be carried out using an interactive voice response system in known fashion. For example, the calling party can be asked to press "one" if the caller is a relative of the called party, "two" if the calling party is the family physician, and "three" if the call is urgent. In response, the calling party generates a dual tone modulated frequency (DTMF) signal using a telephone touchpad, in one embodiment. In another embodiment, the calling party generates a DTMF signal using a computer.

In another embodiment, the calling party is prompted for voice responses to questions. For example, the calling party can be asked to speak the word "one" if the calling party is a relative. In another embodiment, the calling party can be asked to speak a message to be sent to the called party pertaining to the calling party's intended communication. The call subject platform records this message. Voice responses can be digitized and/or translated into text using voice recognition techniques known in the art. Call subject information can include multimedia information. As used herein, the term "multimedia call subject information" includes call subject information that is text, audio, video, graphics, animation, or DTMF, or any combination thereof. Multimedia call subject data can include digital data, analog information, or any combination thereof.

In one embodiment, the DTMF signals are translated by the call subject platform into an audio message. If the DTMF signal for "one" is received alone, then the call subject platform processes the DTMF signal and sends an audio message to the called party that states "A call from a relative is waiting." If the DTMF signal for "two" is received alone, then the call subject platform sends an audio message to the called party that states, "A call from Dr. PHYSICIAN_ NAME is waiting," where PHYSICIAN_NAME is a variable whose value is the name of the family physician.

In another embodiment, voice response messages are played by the call subject platform to the called party. In another embodiment, voice response messages are translated into text and sent to the called party by the call subject platform.

In one embodiment of the present invention, call subject information is processed before being sent to the called party. For example, information provided in an audio voice format by the calling party is translated into text and summarized by the call subject platform before being sent to the called party. In one embodiment, the information is summarized by selecting key words from the call subject data. In another embodiment, the information is summarized by truncating the call subject data received from the calling party.

In another embodiment, at least a part of the call subject information is forwarded to the called party intact, just as it was received from the calling party (e.g., a short voice or video message).

The present invention thus advantageously provides multimedia information to the called party from the calling party to help the called party to decide if the called party desires to communicate with the calling party. This advantageously allows the called party to avoid unwanted communication with a calling party.

Although several embodiments are specifically illustrated and described herein, it will be appreciated that modifications and variations of the present invention are covered by the above teachings and are within the purview of the appended claims without departing from the spirit and intended scope of the invention.

What is claimed is:

1. A method for providing call subject information from an originating device to a destination device, comprising the steps of:

providing a plurality of time of call subject information to the originating device;

receiving a selected item of call subject information from the originating device;

summarizing the selected call subject information;

sending the summary of the selected item of call subject information to a destination device, where the destination device is adapted to communicate with the originating device; and determining if the receiving desire desires to communicate with the originating device and if it is determined that the destination device does not desire to communication with the originating device, then forwarding the summary of the selected item of call subject information to another destination device.

2. The method of claim 1, wherein the summary of the selected item of call subject information is forwarded to a Messaging service as the another destination device.

3. A method for providing call subject information from an originating device to a destination device, comprising the steps of:

providing a plurality of time of call subject information to the originating device;

receiving a selected item of call subject information from the originating device;

summarizing the selected call subject information; and sending the summary of the selected item of call subject information to a destination device, where the destination device is adapted to communicate with the originating device, wherein at least part of the selected item of call subject information from the originating device is received as text and the method further comprising the step of translating at least a part of the text into an audio message adapted to be played to the destination device.

4. A method for providing call subject information from an originating device to a destination device, comprising the steps of:

providing a plurality of time of call subject information to the originating device:

receiving a selected item of call subject information from the originating device:

summarizing the selected call subject information by truncating the selected item of call subject information provided by the originating device; and sending the truncation of the selected item of call subject information to a destination device, where the destination device is adapted to communicate with the originating device.

5. A method for providing call subject information from an originating device to a destination device, comprising the steps of:

sending a summary of a selected item of call subject information to a destination device, the selected item of call subject information being chosen for a plurality of items of call subject information provided to an originating device, wherein the destination device is adapted to communicate with the originating device; and determining if the receiving device desires to communicate with the originating device; and if it is determined that the destination device does not desire to communicate with the originating device, then forwarding the summary of the selected item of call subject information to a Messaging service.

* * * * *